(12) United States Patent
Fukuda et al.

(10) Patent No.: US 7,321,349 B2
(45) Date of Patent: Jan. 22, 2008

(54) DISPLAY ELEMENT, DISPLAY DEVICE, AND MICROLENS ARRAY

(75) Inventors: Toshihiro Fukuda, Kanagawa (JP); Tomoki Furuya, Kanagawa (JP)

(73) Assignee: Sony Corporation, Tokyo (JP)

( * ) Notice: Subject to any disclaimer, the term of this patent is extended or adjusted under 35 U.S.C. 154(b) by 846 days.

(21) Appl. No.: 10/664,641

(22) Filed: Sep. 19, 2003

(65) Prior Publication Data
US 2004/0125048 A1   Jul. 1, 2004

(30) Foreign Application Priority Data
Sep. 20, 2002  (JP) .............................. 2002-275072
Sep. 1, 2003   (JP) .............................. 2003-308874

(51) Int. Cl.
*G03B 21/10*   (2006.01)
(52) U.S. Cl. .............................. 345/84; 345/77; 345/87; 345/905; 353/39; 353/82; 349/57; 349/62; 349/95; 359/363; 359/642; 359/649; 359/677
(58) Field of Classification Search .................. 345/77, 345/84, 87, 905; 349/57, 62, 95; 353/39, 353/82; 359/362, 642, 649, 677
See application file for complete search history.

(56) References Cited
U.S. PATENT DOCUMENTS
4,375,739 A * 3/1983 Machida et al. ............ 451/163
5,398,086 A * 3/1995 Nakano et al. ................ 353/31
6,407,860 B1 * 6/2002 Funazaki et al. ............ 359/457
6,540,361 B1 * 4/2003 Hayashi ........................ 353/31
2001/0048493 A1 * 12/2001 Swanson et al. .............. 349/62
2002/0150333 A1 * 10/2002 Reed et al. .................... 385/34
2002/0196563 A1 * 12/2002 Itoh ........................... 359/741

FOREIGN PATENT DOCUMENTS
JP          09-127496         5/1997

* cited by examiner

*Primary Examiner*—Bipin Shalwala
*Assistant Examiner*—Vincent E. Kovalick
(74) *Attorney, Agent, or Firm*—Robert J. Depke; Rockey, Depke & Lyons, LLC.

(57) ABSTRACT

A display element having a plurality of pixel portions arranged two-dimensionally with a predetermined pixel pitch and a microlens array including a plurality of microlenses arranged two-dimensionally corresponding to the plurality of pixel portions on an incident side or an emission side of light with respect to the pixel portions, wherein, in the microlens array, each microlens has a lens surface of a hyperboloid of revolution, and a lens pitch of the plurality of microlenses is set to a pitch smaller than the lens pitch able to substantially equivalently maintain a converging efficiency of a lens of the hyperboloid of revolution and a lens of an ellipsoid of revolution with respect to the incident light and able to maintain a converging efficiency higher than the converging efficiency of the lens of the ellipsoid of revolution or wherein, in the microlens array, each microlens has a lens surface of a hyperboloid of revolution, and a lens pitch is 20 μm or less; a display device; and a microlens array.

14 Claims, 13 Drawing Sheets

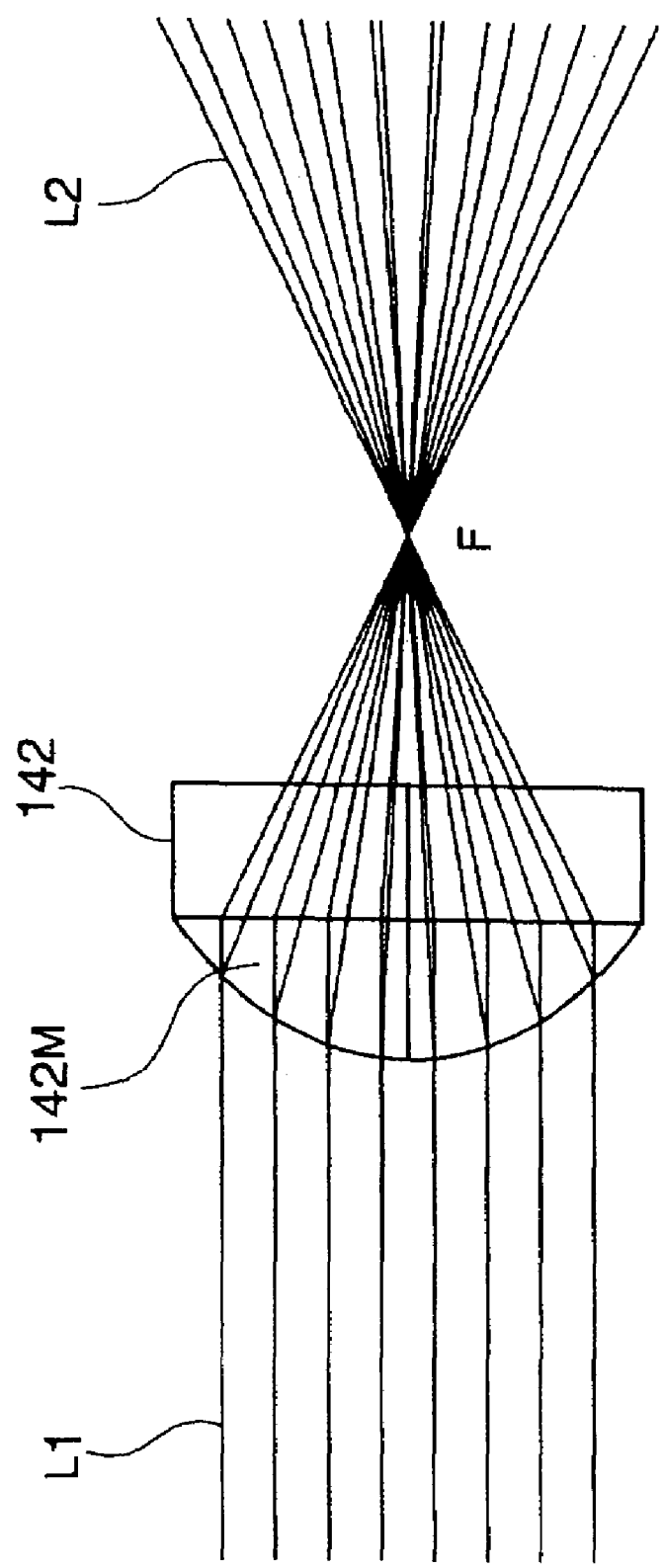

REDUCTION OF
PIXEL PITCH

DISPLAY ELEMENT, DISPLAY DEVICE, AND MICROLENS ARRAY

This application claims priority to Japanese Patent Application Numbers JP2002-275072 filed Sep. 20, 2002 and JP2003-308874 filed Sep. 1, 2003 which are incorporated herein by reference.

BACKGROUND OF THE INVENTION

1. Field of the Invention

The present invention relates to a microlens array, a display element provided with microlenses, and a display device provided with such a display element.

2. Description of the Related Art

Projectors using liquid crystal display (LCD) panels, digital mirror devices (DMD), and other light valves are currently the focus of intensive development. Projectors include data projectors mainly for monitor display of personal computers, front projectors or rear projectors used mainly for home theater and other AV applications, and rear projectors for television applications. Further, they are divided into one- to three-plate types according to the number of light valves used. For example, there are a single-plate type using one light valve and a three-plate type using three light valves corresponding to the three colored lights of red (R), green (G), and blue (B). Further, light valves includes both transmission types and reflection types.

FIG. 1 is a view of an example of the configuration of a liquid crystal display panel in a projection type liquid crystal display device. The liquid crystal display panel shown in FIG. 1 is provided with a pixel electrode substrate 140B and a counter substrate 140A arranged facing an incident surface side of light of the pixel electrode substrate 140B via a liquid crystal layer 145.

The pixel electrode substrate 140B has a glass substrate 148, a plurality of pixel electrode portions 146 laminated on the incident surface side of light of this glass substrate 148, and a plurality of black matrix portions 147. The pixel electrode portions 146 and the black matrix portions 147 are arranged two-dimensionally. Each pixel electrode portion 146 is constituted by a transparent member having conductivity. Each black matrix portion 147 is formed between adjacent pixel electrode portions 146. Each black matrix portion 147 is shielded by for example a metallic film. A not illustrated switching element for selectively supplying voltage in accordance with an image signal to adjacent pixel electrode portions 146 is formed in each region shielded by a black matrix portion 147 on the glass substrate 148. As the switching element for supplying voltage to the pixel electrode portion 146, use is made of for example a thin film transistor (TFT).

The counter substrate 140A has, in order from the incident side of the light, a glass substrate 141, a microlens array 142, and cover glass 144 serving as the glass substrate having the microlens array 142 formed thereon. A resin layer 143 having a refractive index n1 is laminated between the glass substrate 141 and the microlens array 142.

The microlens array 142 is formed corresponding to individual pixels on the light incident side of the liquid crystal layer in order to raise the efficiency of utilization of the light of the light source. As shown in FIG. 1, due to the refraction of the microlenses 142M, the incident light from the light source does not strike regions shield by the black matrix portions 147, interconnect patterns, etc., but is condensed at only the openings of the pixel electrode portions 146.

The microlens array 142 has a plurality of microlenses 142M comprised of optical resin having a refractive index of 2n (>n1) and provided two-dimensionally corresponding to the pixel electrode portions 146. As shown in FIG. 1, the size of the microlenses 142M corresponds to the size of the pixels.

Each microlens 142M is shaped convexly at the incident side of the light, has a positive refraction power, and condenses light incident via the glass substrate 141 and the resin layer 143 toward the corresponding pixel electrode portion 146. The light condensed by the microlens 142M and incident upon the opening is used for image display.

Conventionally, each microlens 142 has been made aspherical in shape and incident light has been condensed to the pixel under conditions giving a spherical aberration of zero. For example, the microlens 142 is made aspherical in shape by cutting away part of its ellipsoid of revolution, hyperboloid of revolution, or the like. If using a microlens of such an aspherical shape, it becomes possible to condense the incident light to approximately a single point.

FIG. 2 is a view of the ray tracing of a microlens 142M having the ellipsoid of revolution. As shown in FIG. 2, the incident light L1 strikes the microlens 142M having the oval sphere. The emitted light L2 is substantially completely condensed at a focal point F. The same result is obtained for a microlens having the hyperboloid of revolution.

On the other hand, in the case of a microlens having a convex spherical surface, due to the spherical aberration, the emitted light cannot be condensed at a single point. It becomes a spot having a certain degree of spread, and the efficiency of the microlens is lowered.

Conventionally, as the method of formation of a microlens for a high definition liquid crystal display panel designed for a liquid crystal projector application, methods of using a quartz substrate or a neoserum substrate or other various glass substrates and forming the microlens by wet etching, photo polymerization, dry etching, etc. have been put into practical use.

In the etching process, the glass substrate is etched from a minute opening of a resist covering the surface of the glass substrate to form a concave spherical surface. A transparent resin having a different refractive index from that of the glass substrate is filled in this concave spherical surface to form the microlens.

In photo polymerization, ions are isotropically diffused into the glass from one point of the surface of the glass substrate to locally change the refractive index and form the microlens.

Wet etching is isotropic etching. Under actual circumstances, there is only the example of a microlens of a rotating symmetrical shape (for example a spherical shape). A lens power is produced by the refractive index difference $\Delta n$ between the resin and the glass substrate to impart a lens action. In this case, since the etching of the substrate is isotropic, it can only form a spherical structure or a cylindrical surface or other rotating symmetrical shape. Under actual circumstances, the spherical structure is the general structure.

In dry etching, semiconductor formation technology is applied to also form aspherical surface shapes other than spherical surfaces.

Photo polymerization can be very precisely controlled. A process excellent in control of the lens shape can also be used to form a lens shape having a aspherical surface shape.

It is possible to form an aspherical surface by both photo polymerization and dry etching. A rotating ellipsoid can be relatively easily formed.

Since a microlens having an aspherical surface shape is used, there is no spherical aberration. Therefore, there is no dispersal of the light passed through the microlens due to spherical aberration, the light can be condensed with a sufficiently high efficiency within a range of an F number of the projection lens (angle at which the projection lens can be received), and the converging efficiency is more excellent than that of a spherical lens. Since an elliptic lens can be easily produced, conventionally a microlens having a rotating elliptic shape has been widely used.

Japanese Unexamined Patent Publication (Kokai) No. 9-127496 discloses a display device using microlenses of aspherical surface shapes of elliptic spherical surface shapes or rotating hyperboloid of revolution shapes.

Summarizing the problems to be solved by the present invention, in recent years, liquid crystal projectors have been made smaller in the size of the liquid crystal display panels and made higher in definition. When a liquid crystal display panel becomes small is size, as illustrated in FIGS. 3A and 3B, the pixel size is reduced in proportion to this. Therefore, the microlenses per se and the pitch arrangement become small. Along with this, it is also necessary to make the cover glass thinner.

FIG. 3A is a schematic view enlarging one pixel's worth of the liquid crystal display panel shown in FIG. 1. A microlens 142M condenses the incident light from a light source and emits it to an opening of a pixel electrode portion 146 surrounded by a black matrix portion 147, interconnect pattern, etc.

FIG. 3B shows a case where the pixel size and the pixel pitch are reduced. Along with the reduction of the pixel pitch, that is, the increase of the definition of the liquid crystal display panel, the microlens 142M per se must be similarly reduced. Due to this, it is necessary to shorten the focus of the microlens 142M and make the cover glass 144 extremely thin. Further, when the pixel size is reduced, the size of the opening of the pixel electrode portion 146 becomes relatively small, so means for projecting the light and maintaining a high illumination luminance on the screen for displaying the image is necessary.

Specifically, when the pixel pitch is 20 µm or more, if the aperture ratio is 40% or more and the focal length is 40 µm or more, a microlens 142M of an ellipsoid exhibits good performance, but when the pixel pitch becomes smaller, the aperture ratio becomes smaller along with that. Further, when the focal length is shortened, an ellipsoid microlens 142 has a larger variation in converging efficiency with respect to variation of the focal length and the thickness of the cover glass 144. Due to this, there is a tendency for the change in luminance to become greater.

Accordingly, when increasing the definition, if using an ellipsoid microlens 142M, it is necessary to finely control the focal length, so the cover glass 144 has to be made very thin. Due to this, at the stage of producing the cover glass 144, it is necessary to control the thickness of the resin and raise the polishing precision. These are technically difficult and lead to a rise of the costs.

For example, when trying to make the cover glass 144 thin to 30 µm or less in actual thickness, due to the difference of effective shrinkage or coefficient of thermal expansion of the optical resin constituting the microlens 142M, stress occurs and waviness and warping of the cover glass 144 occur. In general, cover glass 144 having an actual thickness of 20 µm is thought to be the limit of existing processing technology.

SUMMARY OF THE INVENTION

An object of the present invention is to provide a display element, a display device, and a microlens array able to handle a higher definition display.

According to a first aspect of the present invention, there is provided a display element having a plurality of pixel portions arranged two-dimensionally with a predetermined pixel pitch and a microlens array including a plurality of microlenses arranged two-dimensionally corresponding to the plurality of pixel portions on an incident side or an emission side of light with respect to the pixel portions, wherein, in the microlens array, each microlens has a lens surface of a hyperboloid of revolution, and a lens pitch of the plurality of microlenses is set to a pitch smaller than the lens pitch able to substantially equivalently maintain a converging efficiency of a lens of the hyperboloid of revolution and a lens of an ellipsoid of revolution with respect to the incident light and able to maintain a converging efficiency higher than the converging efficiency of the lens of the ellipsoid of revolution.

Preferably, the pixel pitch is made 20 µm or less.

Preferably, the focal position of each microlens substantially coincides with each pixel portion.

According to a second aspect of the present invention, there is provided a display element having a plurality of pixel portions arranged two-dimensionally with a predetermined pixel pitch and a microlens array including a plurality of microlenses arranged two-dimensionally corresponding to the plurality of pixel portions on an incident side or an emission side of light with respect to the pixel portions, wherein, in the microlens array, each microlens has a lens surface of a hyperboloid of revolution, and a lens pitch is 20 µm or less.

Preferably, the pixel pitch is 20 µm or less.

Preferably, the focal position of each microlens substantially coincides with each pixel portion.

According to a third aspect of the present invention, there is provided a display device having a plurality of pixel portions arranged two-dimensionally with a predetermined pixel pitch, a light source emitting illumination light for illuminating the pixel portions, a microlens array including a plurality of microlenses arranged two-dimensionally corresponding to the plurality of pixel portions on an incident side or an emission side of light with respect to the pixel portions, and a projection lens for projecting light emitted from the pixel portions, wherein, in the microlens array, each microlens has a lens surface of a hyperboloid of revolution, and a lens pitch of the plurality of microlenses is set to a pitch smaller than a lens pitch able to substantially equivalently maintain a converging efficiency of a lens of a hyperboloid of revolution and a lens of an ellipsoid of revolution with respect to the incident light and able to maintain a converging efficiency higher than the converging efficiency of a lens of the ellipsoid of revolution.

Preferably, the pixel pitch is 20 µm or less.

Preferably, the focal position of each microlens substantially coincides with each pixel portion.

According to a fourth aspect of the present invention, there is provided a display device having a plurality of pixel portions arranged two-dimensionally with a predetermined pixel pitch, a light source emitting illumination light for illuminating the pixel portions, a microlens array including a plurality of microlenses arranged two-dimensionally corresponding to the plurality of pixel portions on an incident side or an emission side of light with respect to the pixel portions, and a projection lens for projecting light emitted from the pixel portions, wherein, in the microlens array, each microlens has a lens surface of a hyperboloid of revolution, and a lens pitch is 20 µm or less.

Preferably, the pixel pitch is 20 µm or less.

Preferably, the focal position of each microlens substantially coincides with each pixel portion.

According to a fifth aspect of the present invention, there is provided a microlens array including a plurality of two-dimensionally arranged microlenses, wherein each microlens has a lens surface of a hyperboloid of revolution, and the lens pitch of the plurality of microlenses is set at a pitch smaller than the lens pitch able to substantially equivalently maintain the converging efficiency of a lens of a hyperboloid of revolution and a lens of an ellipsoid of revolution with respect to the incident light and able to maintain a higher converging efficiency than the focus efficiency of a lens of the ellipsoid of revolution.

According to a sixth aspect of the present invention, there is provided a microlens array including a plurality of two-dimensionally arranged microlenses, wherein each microlens has a lens surface of a hyperboloid of revolution, and the lens pitch of the plurality of microlenses is 20 µm or less.

According to the present invention, microlenses of hyperboloid of revolution shapes having a lens pitch of 20 µm or less are two-dimensionally arranged and light incident upon each microlens is condensed to a corresponding pixel portion. A microlens of the hyperboloid of revolution shape having a lens pitch of 20 µm or less is not lowered in converging efficiency and condenses light to a pixel portion having a size of 20 µm or less even if there is a variation in the focal length and the distance between the microlens and the pixel portion.

BRIEF DESCRIPTION OF THE DRAWINGS

The above object and features of the present invention will be more apparent from the following description of the preferred embodiments given with reference to the accompanying drawings, wherein:

FIG. 2 is a ray tracing diagram of a microlens having a rotating oval surface;

DESCRIPTION OF THE PREFERRED EMBODIMENTS

Below, an explanation will be given of embodiments of the present invention with reference to the drawings. As an example of the display element and the display device of the present invention, the description will be given using a liquid crystal display element and a projection type liquid crystal display device.

First Embodiment

Figure 4:
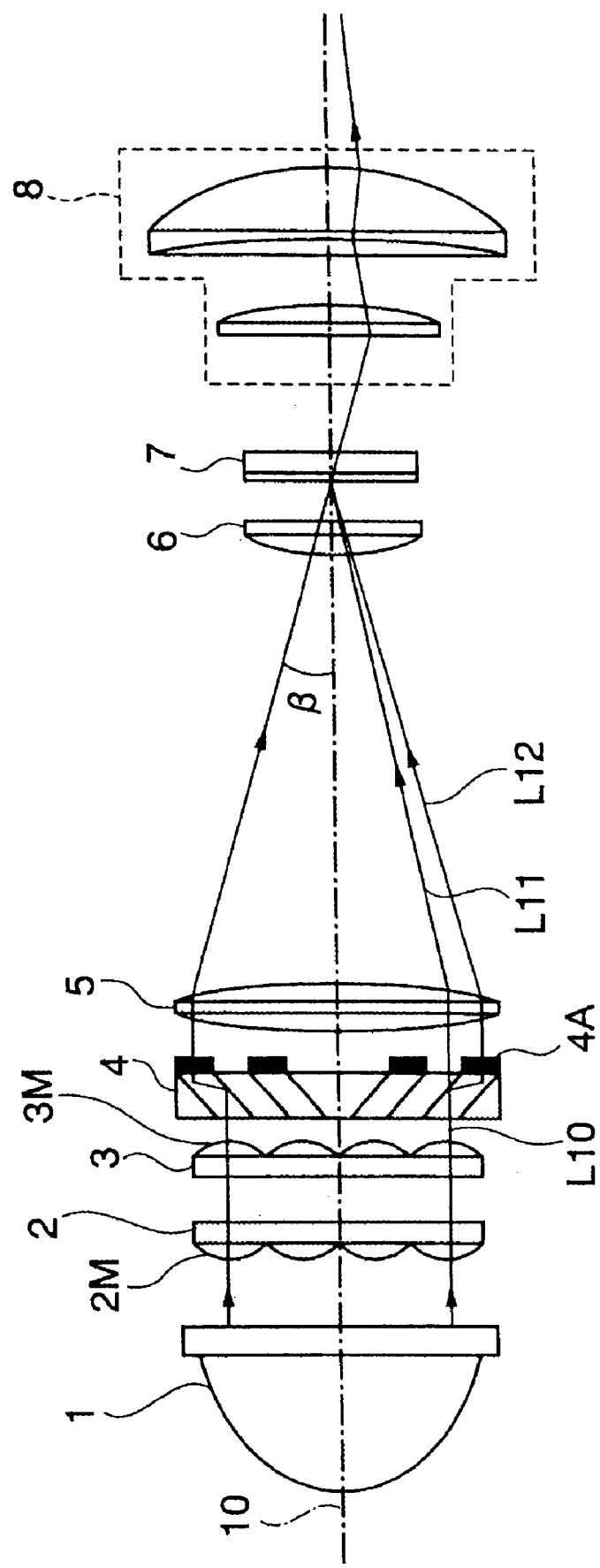
FIG. 4 is a schematic view of the configuration of a display device according to a first embodiment of the present invention.

FIG. 4 shows the schematic configuration of an liquid crystal display device according to a first embodiment of the present invention. This liquid crystal display device is configured by arranging a light source 1, a pair of a first lens array 2 and a second lens array (hereinafter described as "MLA") 3, a PS combining element 4, a condenser lens 5, a field lens 6, a liquid crystal display panel 7, and a projection lens 8, in that order, along an optical axis 10.

The MLA 2 and MLA 3 are comprised of pluralities of microlenses 2M and 3M two-dimensionally arranged. The PS combining element 4 is provided with a plurality of ½ wavelength plates 4A at locations corresponding to spaces between adjacent lenses in the second MLA 3.

The MLA 2 and MLA 3 divide the illumination light emitted from the light source 1 to small light beams and make them strike the PS combining element 4.

The PS combining element 4 splits the incident light is L10 to polarized light L11 and L12 (P polarization component and S polarization component) orthogonal to each other within a plane vertical to the optical axis 10 and makes the polarizing directions of the split polarized lights L11 and L12 uniform in a specific direction.

The liquid crystal display panel 7 spatially modulates and emits the light emitted from the PS combining element 4 and passed through the condenser lens 5 and the field lens 6 in accordance with an image signal.

The projection lens 8 projects the light emitted from the liquid crystal display panel 7 to a not illustrated screen and forms an image on the screen.

Note that, in FIG. 4, a direction orthogonal to the optical axis 10 within a sheet surface will be referred to as the "horizontal direction", and a direction vertical to the sheet surface will be referred to as the "vertical direction".

Figure 5:
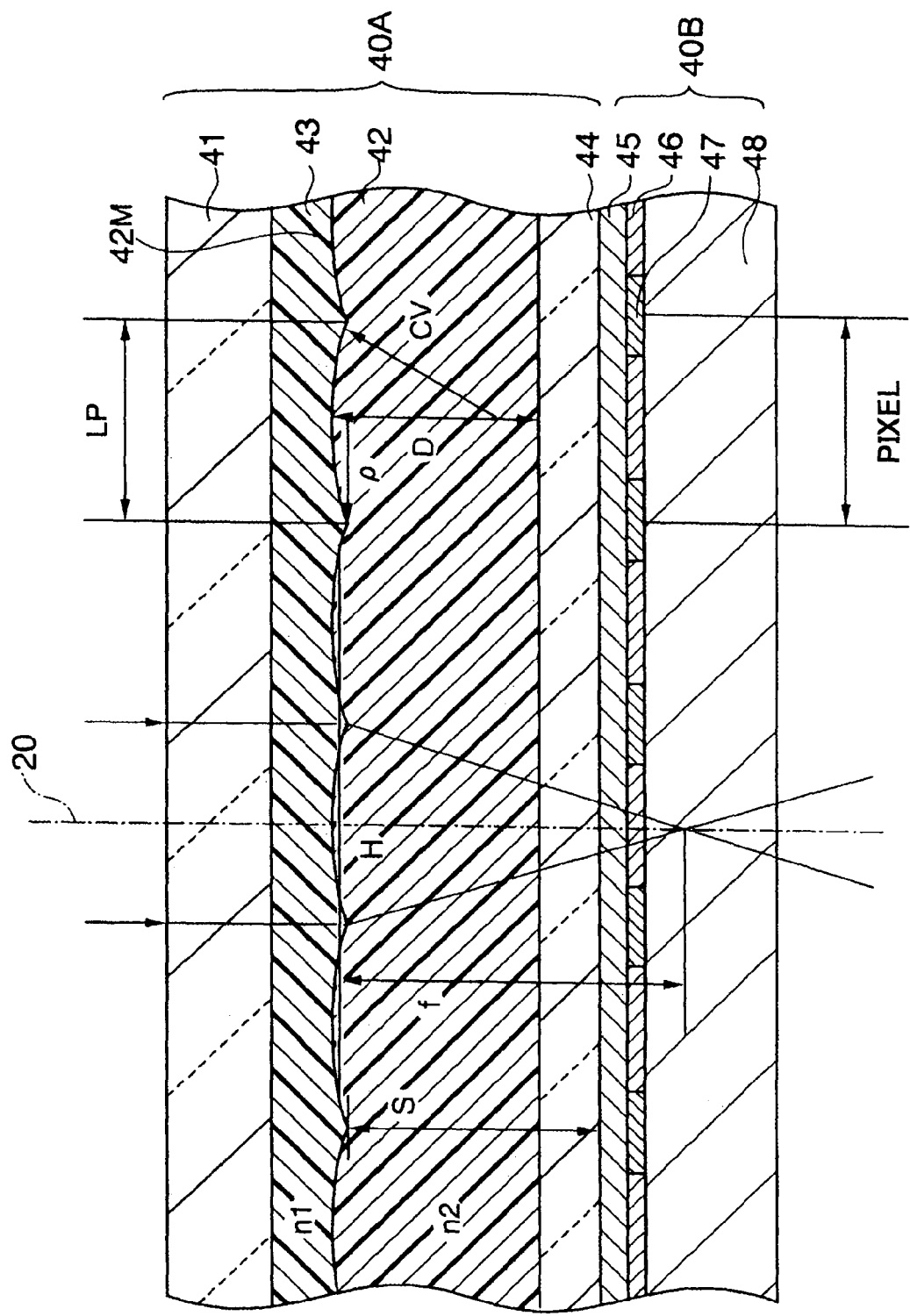
FIG. 5 is a view of an example of the configuration of a display element in the display device according to the first embodiment of the present invention.

FIG. 5 is a sectional view of an example of the configuration of a liquid crystal display panel 7.

As shown in FIG. 5, the liquid crystal display panel 7 is provided with a pixel electrode substrate 40B and a counter substrate 40A arranged facing it via a liquid crystal layer 45 on the incident surface side of light of the pixel electrode substrate 40B.

The pixel electrode substrate 40B has a glass substrate 48, a plurality of pixel electrode portions 46 laminated on the incident surface side of light of this glass substrate 48, and a plurality of black matrix portions 47. The pixel electrode portions 46 and the black matrix portions 47 are two-dimensionally arranged. Each pixel electrode portion 46 is constituted by a transparent member having conductivity. Each black matrix portion 47 is formed between adjacent pixel electrode portions 46. Each black matrix portion 47 is shielded by for example a metallic film. A not illustrated switching element for selectively supplying voltage in accordance with an image signal to adjacent pixel electrode portions 46 is formed in a region shielded by the black matrix portion 47 on the glass substrate 48. As the switching element for supplying voltage to the pixel electrode portion 46, use is made of for example a TFT.

The counter substrate 40A has, in order from the incident side of the light, a glass substrate 41, a microlens array 42, and cover glass 44 serving as the glass substrate having the microlens array 42 formed thereon. A resin layer 43 is laminated between the glass substrate 41 and the microlens array 42. Note that, though not illustrated, a counter electrode for generating a potential with the pixel electrode portion 46 is arranged between the cover glass 44 and the liquid crystal layer 45. The resin layer 43 is constituted by an optical resin having a refractive index of n1.

The microlens array 42 has a plurality of microlenses 42M constituted by an optical resin having a refractive index of n2 (>n1) and two-dimensionally provided corresponding to the pixel electrode portions 46. One or more condensing use lens surfaces are arranged in the optical axis direction per pixel.

In the present embodiment, in the liquid crystal display panel 7, to deal with the reduction of size and increased definitions, the pixel pitch shown in FIG. 5 is set at for example 20 μm or less. Corresponding to that, the microlens array 42 is formed with a lens pitch (LP) of 20 μm or less.

When the lens pitch becomes 20 μm or less, due to the variation of the focal length of the microlenses 42M and the variation of the thickness of the optical resin from the lens edge to the liquid crystal layer 45, the converging efficiency of the microlenses 42 is liable to fluctuate and the display luminance to fluctuate or declined on the screen.

In the present embodiment, each microlens 42M is formed in shape with a hyperboloid of revolution (rotating hyperboloid). Due to this, when the lens pitch is 20 μm or less, even if there is a variation in the focal length of the microlenses 42M and a variation in the thickness of the optical resin from the lens edge to the liquid crystal layer 45, the converging efficiency of the microlens array 42 does not greatly fluctuate.

The lens surfaces of the rotating hyperboloid of the microlens 42M are defined by the following equation 1. In equation 1, Z is a function representing a lens curve, CV a curvature radius, ρ a lens radius, and CC an aspherical constant. The parameters are shown in FIG. 5.

$$Z = \frac{\rho^2 / CV}{1 + \sqrt{1 - (1 + CC)\rho^2 / CV^2}} \quad (1)$$

In equation 1, when the aspherical constant CC<−1, the function Z represents a hyperboloid, when −1<CC<0, Z represents an ellipsoid, while when CC=−1, Z represents a paraboloid.

Further, as shown in Japanese Unexamined Patent Publication (Kokai) No. 9-127496, the rotating hyperboloid shape of the microlens 42M and the refractive indexes n1 and n2 of the optical resin of the two sides of the lens surface of the microlens 42M satisfy the condition that the spherical aberration becomes zero. The microlens 42M condenses the incident light beam to the opening of the pixel electrode portion 46 without spherical aberration.

The microlenses 42M are constituted so that the focal position of each microlens 42M substantially coincides with the position of an opening of a pixel electrode portion.

A microlens 42M has a convex shape on the incident side of the light, so has a positive refraction power and condenses the light incident via the glass substrate 41 and the resin layer 43 toward a corresponding pixel electrode portion 46. If a sufficient F number is secured for the projection lens 8 in the following stage, the light condenses by the microlens 42M and incident upon the opening of the pixel electrode portion 46 in the light incident upon the liquid crystal display panel 7 becomes effective light which can be utilized for the image display.

Since the microlens 42M is provided, a great amount of light can be made incident upon the opening of a pixel electrode portion 46, the effective aperture ratio is raised, and the light utilization efficiency can be improved.

Simulation was carried out for the optical characteristics of the above microlens array 42. The results of the simulation will be explained next.

In the stage of producing the microlenses, when the lenses are transferred onto the glass substrate, due to variations of the refractive index, etching, etc., the focal lengths f of the lenses are thought to fluctuate by about ±10 μm. Also, the thickness of the optical resin from the microlenses 42M to the liquid crystal layer 45 is thought to fluctuate by about ±10 μm due to variations in polishing etc.

In the simulation explained next, the change of the converging efficiency of the microlenses when the above fluctuation occurs will be considered.

Here, the "focal length" means the optical path length from the principal point of a microlens 42M to a location where the light beam is converged and the luminance becomes the maximum as shown in FIG. 5. Namely, this is the value obtained by converting the actual thickness of each layer to the optical path length in the air. In FIG. 6 to FIG. 11, such a definition will be used.

Figure 6:
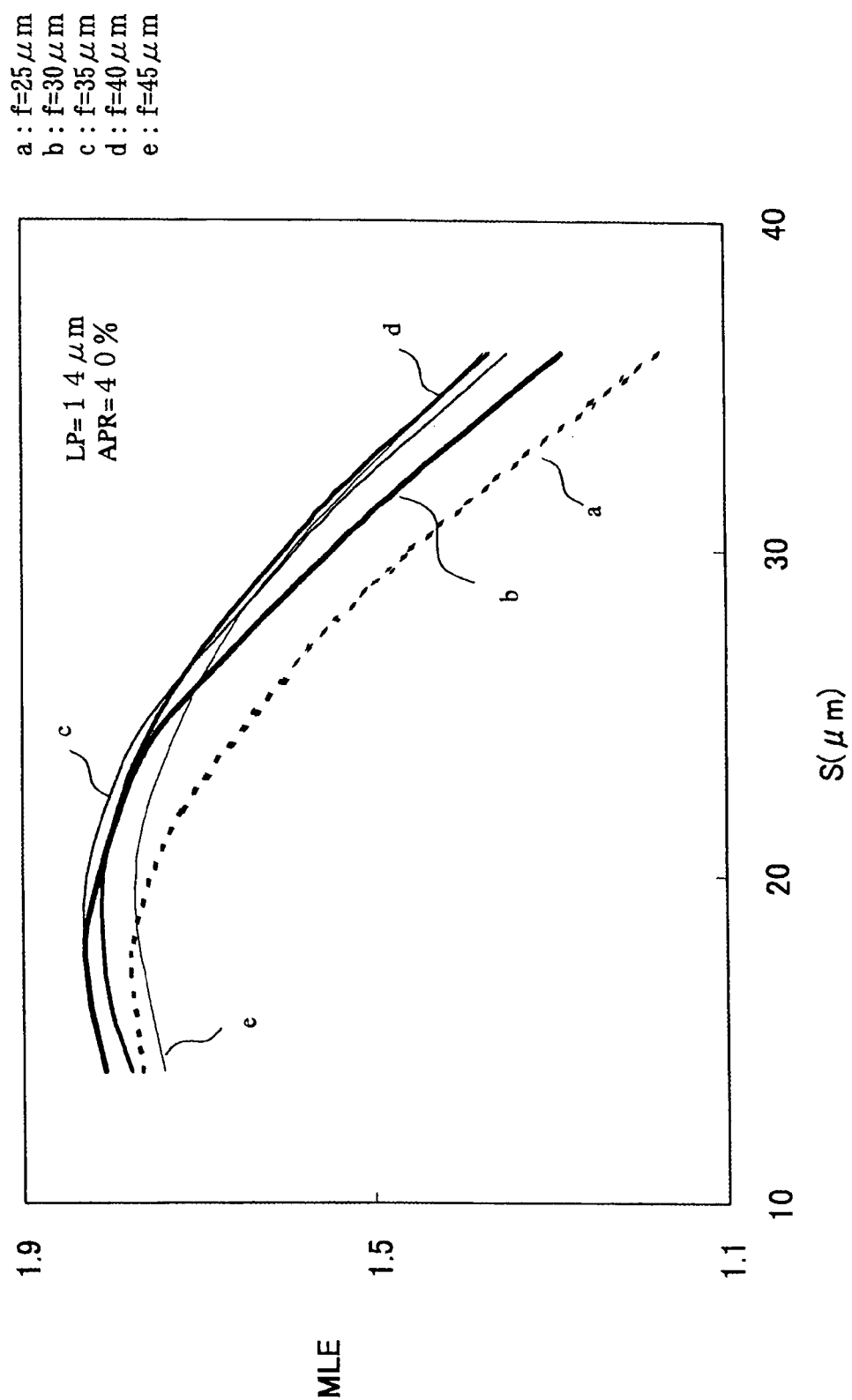
FIG. 6 is a graph of simulation results for rotating hyperboloid microlenses having a lens pitch of 20 µm or less.

In FIG. 6, an abscissa indicates an optical path length S from the edge of a microlens 42M to the interface between the cover glass 44 and the liquid crystal layer 45 as shown in FIG. 5. Here, this is defined as the sum of a product of the actual thickness of the resin constituting the microlens 42M and the refractive index of the resin and a product of the actual thickness of the cover glass 44 and the refractive index thereof and will be referred to as the "optical path length" below.

Further, an ordinate indicates the converging efficiency of a microlens 42M. Below, the converging efficiency of a microlens 42M will be referred to as an "ML efficiency". The ML efficiency is a ratio of the luminance of the screen in an optical system when the microlens array 42 is mounted on the counter substrate 40A with respect to the luminance on the optical system projection screen when the microlens array 42 is not mounted on the counter substrate 40A by using the liquid crystal display panel 7.

In the simulation of FIG. 6, as an example, the lens pitch LP is set at 14 μm. Further, the aspherical constant CC of the hyperboloid is −1.290. Curves "a", "b", "c", "d", and "e" shown in the figure indicate the results of the simulation of the change of the ML efficiency according to the optical path length S in a microlens 42M when the focal length "f"

becomes 25 μm, 30 μm, 35 μm, 40 μm, and 45 μm for a hyperboloid microlens array 42 wherein the lens pitch LP becomes 14 μm.

In the simulation of FIG. 6, the light source 1 is a UHP type, and an arc length of that lamp is 1.4 mm. Each of the first lens array 2 and the second lens array 3 is constituted by for example 8 (vertical)×6 (horizontal) microlenses. The incident light dispersion angle with respect to the liquid crystal display panel 7 becomes 9° in the vertical direction and 10° in the horizontal direction with respect to the principal light. Further, the aperture ratio APR of the pixel electrode portion 46 is made 40%, and the F number of the projection lens 8 is F1.7.

As shown in FIG. 6, when use is made of hyperboloid microlenses 42M having a lens pitch of 14 μm, when the focal length f fluctuates within a range from 45 μm to 25 μm, the reduction of the ML efficiency is small. The reduction rate thereof stays at about 16%. Further, when the focal length f fluctuates within a range from 45 μm to 25 μm, and the optical path length S fluctuates within a range from 20 μm to 30 μm, the ML efficiency can be held at about 1.5 or more. When the optical path length S becomes about 18 μm, the ML efficiency is 1.7 to 1.8 and becomes the maximum.

Accordingly, when use is made of hyperboloid microlenses 42M having a lens pitch of 14 μm, even if there is a variation of 45 μm to 25 μm in the focal length f and a variation of 20 μm to 30 μm in the optical path length S, a sufficient ML efficiency can be secured for a high luminance display. Namely, there is a margin of the change of luminance with respect to variations of the focal length f and the optical path length S.

Further, even if the optical path length S is relatively long (up to 30 μm), an ML efficiency sufficient for high luminance display can be secured.

Figure 7:
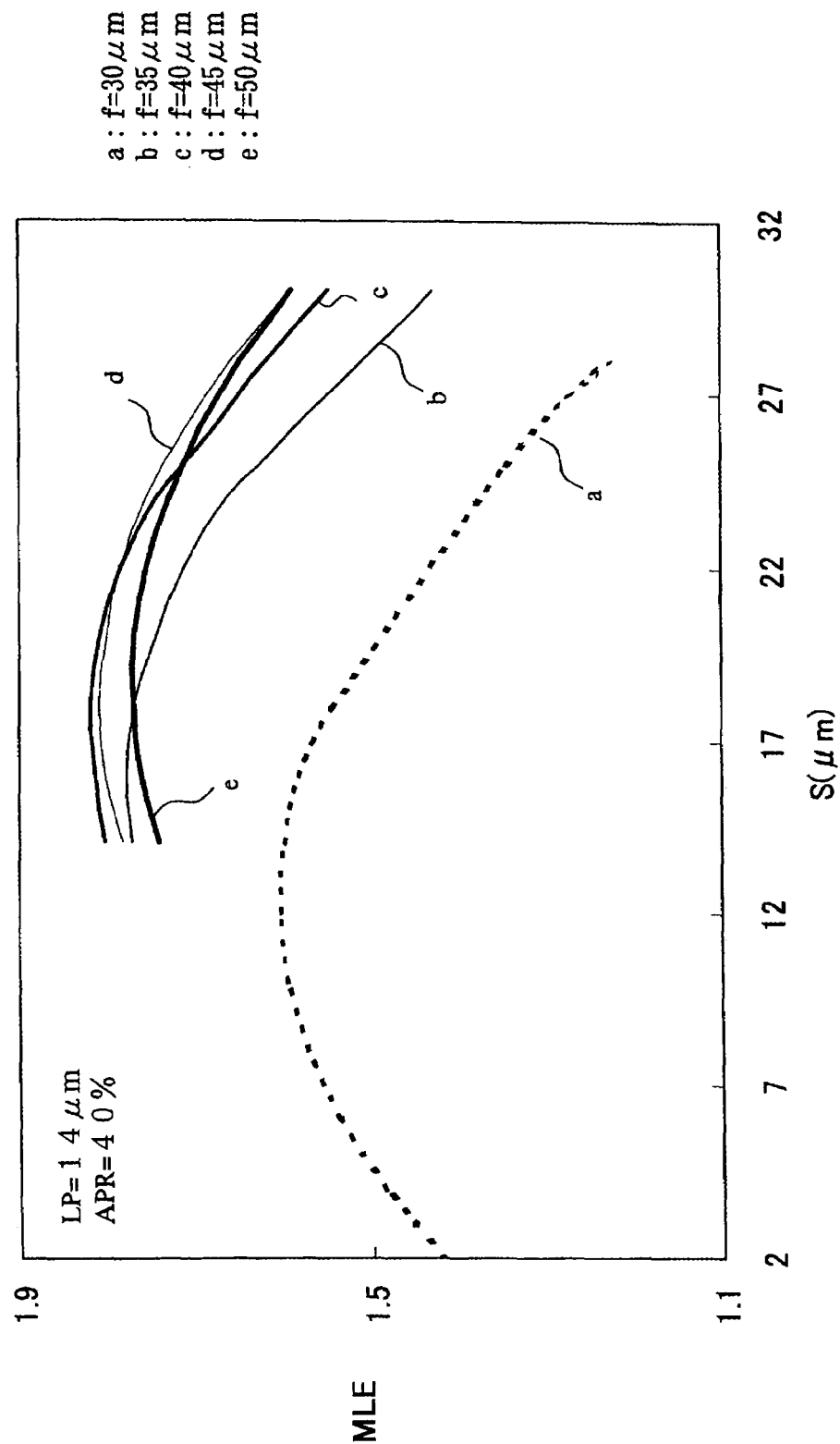
FIG. 7 is a graph of simulation results for rotating ellipsoid microlenses having a lens pitch of 20 µm or less.

As a comparative example of the simulation of the hyperboloid microlens of FIG. 6, FIG. 7 shows simulation results for a microlens array wherein the lens surface has a shape with an ellipsoid of revolution (rotating ellipsoid) and the lens pitch is 14 μm. The shape of the rotating ellipsoid is defined by equation 1, and the aspherical constant CC is −0.775.

In FIG. 7, curves "a", "b", "c", "d", and "e" indicate the results of simulation of the change of the ML efficiencies in microlenses having focal lengths "f" of 30 μm, 35 μm, 40 μm, 45 μm, and 50 μm according to the optical path length S for the ellipsoid microlens array wherein the lens pitch LP is 14 μm.

The conditions of the optical system are similar to those of the simulation of FIG. 6. Namely, the light source 1 is a UHP type, the arc length of the lamp is 1.4 mm, each of the first lens array 2 and the second lens array 3 is constituted by 8 (vertical)×6 (horizontal) microlenses, and the incident light dispersion angle with respect to the liquid crystal display panel 7 becomes 9° in the vertical direction and 10° in the horizontal direction with respect to the principal light. Further, the aperture ratio APR of the pixel electrode portion 46 is 40%, and the F number of the projection lens 8 is F1.7.

As shown in FIG. 7, with rotating ellipsoid microlenses having a lens pitch of 14 μm, if the focal length f is 35 μm or more, even if the optical path length S fluctuates up to 30 μm, the ML efficiency can be held at about 1.5 or more. When the optical path length S is about 18 μm, the ML efficiency is 1.7 to 1.8 and becomes the maximum. The above results are the same as the results when the hyperboloid microlenses shown in FIG. 6 have focal lengths within a range from 25 μm to 45 μm.

As shown in FIG. 7, however, when the focal length "f" of the rotating ellipsoid microlens becomes further short and f=30 μm, the ML efficiency is greatly reduced. When the optical path length S is about 12 μm, the ML efficiency becomes the maximum value 1.6, but when the optical path length S is 30 μm, the ML efficiency is reduced to 1.2 or reduced by about 30% in comparison with the ML efficiency when the focal length "f" is 35 μm or more.

Namely, ellipsoid microlenses having a lens pitch of 14 μm can secure an ML efficiency sufficient for high luminance display when there is a variation of 45 μm to 35 μm in the focal length "f" and a variation of 20 μm to 30 μm in the optical path length S. When the focal length "f", becomes 30 μm or less, however, the ML efficiency is lowered greatly with a relatively long optical path length S (up to 30 μm), and it becomes impossible to secure a sufficient ML efficiency.

Accordingly, it is learned that an ellipsoid microlens has a margin of luminance change smaller than that of a hyperboloid microlens with respect to variation in the focal length "f" and the optical path length S.

Figure 8:
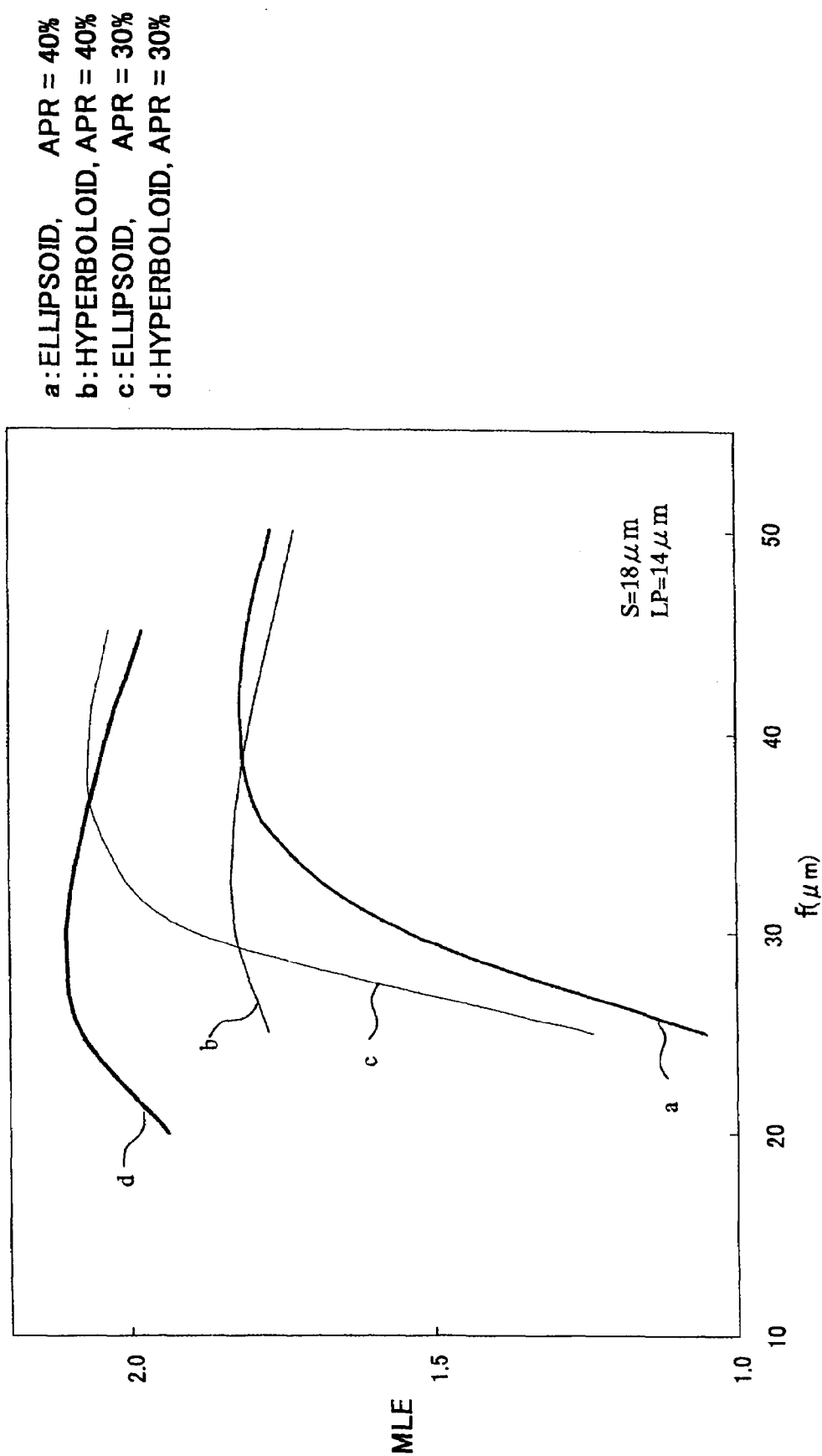
FIG. 8 is a graph of results of a simulation comparing characteristics of rotating hyperboloid of microlenses having a lens pitch of 20 µm or less and rotating ellipsoid microlenses having a lens pitch of 20 µm or less.

FIG. 8 shows the results of simulation having a tendency for the ML efficiency to change according to the focal length "f" of the lens and the aperture ratio APR of the pixel electrode portion 46 when the lens pitch is 14 μm for rotating hyperboloid microlenses and rotating ellipsoid lenses used in the simulations of FIG. 6 and FIG. 7. In FIG. 8, an ordinate indicates the ML efficiency, and the abscissa indicates the focal length f of the microlens.

In FIG. 8, curves "a" and "b" in the figure show the results of simulation of the change of the ML efficiency according to the focal length "f" when the pixel portion aperture ratio APR is 40% in an ellipsoid microlens array and a hyperboloid microlens array, and "c" and "d" indicate the results of simulation of the change of the ML efficiency according to the focal length "f" when the pixel portion aperture ratio APR is 30% in the ellipsoid microlens array and the hyperboloid microlens array.

The conditions of the optical system used in the simulation are similar to those of the simulations of FIG. 6 and FIG. 7. The rotating hyperboloids and the rotating ellipsoid are defined by equation 1, and their aspherical constants CC are −1.290 and −0.775. Further, in the simulation of FIG. 8, the optical path length S is made a constant 18 μm for both of the rotating hyperboloids and the rotating ellipsoid.

As shown in FIG. 8, when the pixel portion aperture ratio APR changes, both of the ML efficiencies of the rotating hyperboloid microlenses and the rotating ellipsoid microlenses having the lens pitch of 14 μm change. When the focal length "f" is 35 μm or more, the ML efficiencies of the rotating hyperboloid microlens and the rotating ellipsoid microlens are substantially the same and in addition substantially similarly change according to the aperture ratio APR.

When the focal length "f" becomes 35 μm or less, however, the ML efficiency of a rotating ellipsoid microlens is rapidly reduced. Contrary to this, the ML efficiency of a rotating hyperboloid microlens is held substantially constant and does not fluctuate so much until "f" becomes 22 μm.

Accordingly, it is seen that the hyperboloid microlens has a margin of luminance change with respect to variation of the focal length even if the aperture ratio APR fluctuates in comparison with an ellipsoid microlens.

Figure 9:
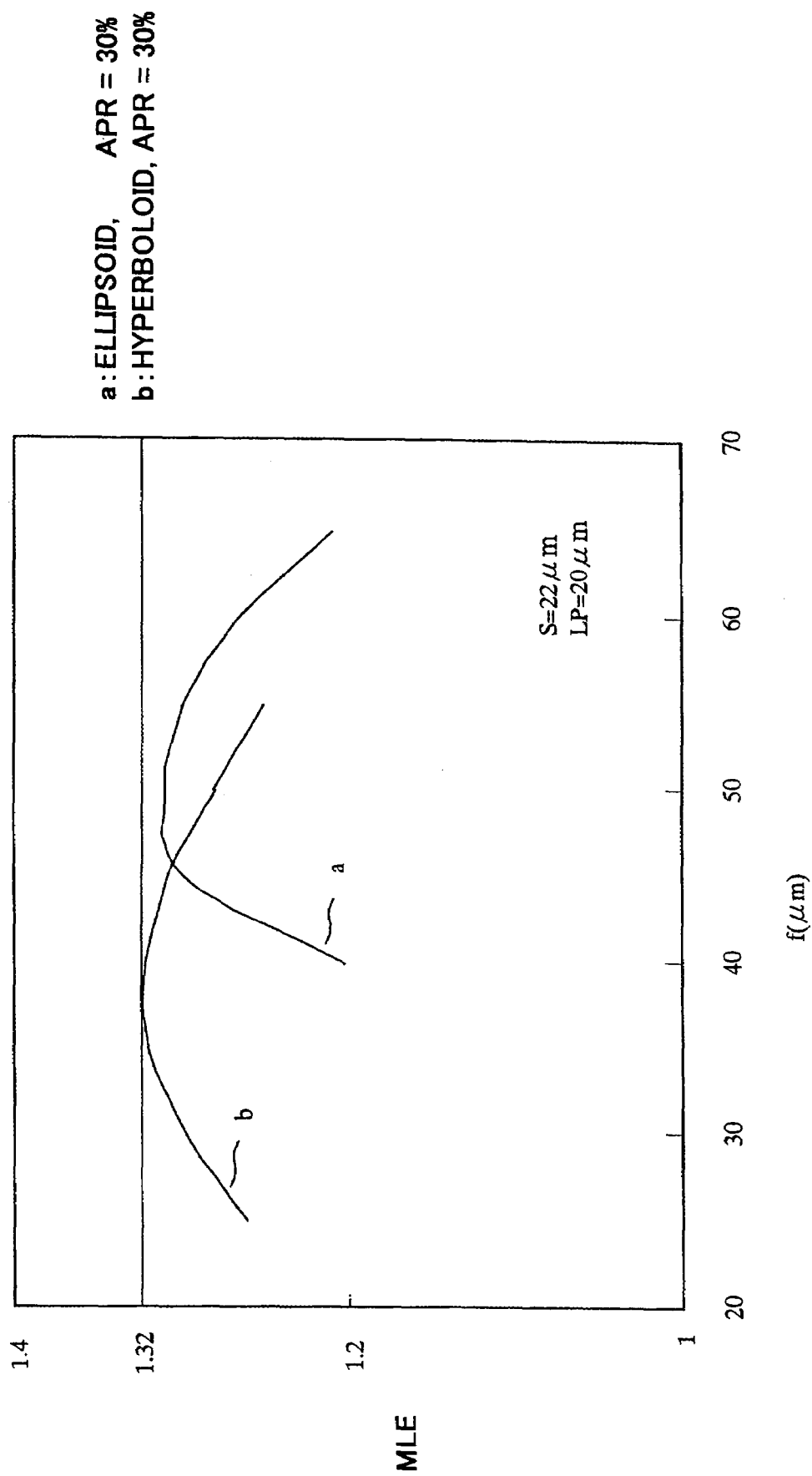
FIG. 9 is a graph of results of a simulation comparing characteristics of rotating hyperboloid microlenses having a lens pitch of 20 µm and rotating ellipsoid microlenses having a lens pitch of 20 µm.

FIG. 9 shows the simulation results showing a tendency for the ML efficiency and the maximum value thereof to change according to the focal length "f" of the lens for rotating hyperboloid microlenses and rotating ellipsoid lenses where the lens pitch (LP) is 20 µm. In FIG. 9, the ordinate indicates the ML efficiency, and the abscissa indicates the focal length "f" of the microlens.

Specifically, the curve "a" indicates the results of simulation of the change of the ML efficiency according to the focal length "f" for an ellipsoid microlens array, and the curve "b" indicates the results of the simulation of the change of the ML efficiency according to the focal length "f" for a hyperboloid microlens array.

FIG. 9 reflects the variations of the ML efficiencies of the ellipsoid and hyperboloid microlens arrays due to variations of the focal lengths.

The conditions of the optical system used in the simulation of FIG. 9 are similar to those of the simulations of FIG. 6 and FIG. 7. Namely, the light source 1 is a UHP type, and the arc length of the lamp is 1.4 mm. Each of the first lens array 2 and the second lens array 3 is constituted by 8 (vertical)×6 (horizontal) microlenses. The incident light dispersion angle with respect to the liquid crystal display panel 7 becomes 9° in the vertical direction and 10° in the horizontal direction with respect to the principal light.

The rotating hyperboloids and the rotating ellipsoids are defined by Equation 1, and their aspherical constants CC are −1.290 and −0.775. Further, in the simulation of FIG. 9, both of the rotating hyperboloids and the rotating ellipsoids make the optical path length S a constant 22 µm. Further, the aperture ratio APR of the pixel electrode portion 46 is 30%, and the F number of the projection lens 8 is F1.7.

As shown in FIG. 9, when the lens pitch LP is 20 µm, a hyperboloid shape has a slightly higher ML efficiency in comparison with an ellipsoid shape. According to FIG. 9, the ML efficiency of the hyperboloid shaped lens array is 1.32, and the ML efficiency of the ellipsoid shaped lens array is 1.31.

Figure 10:
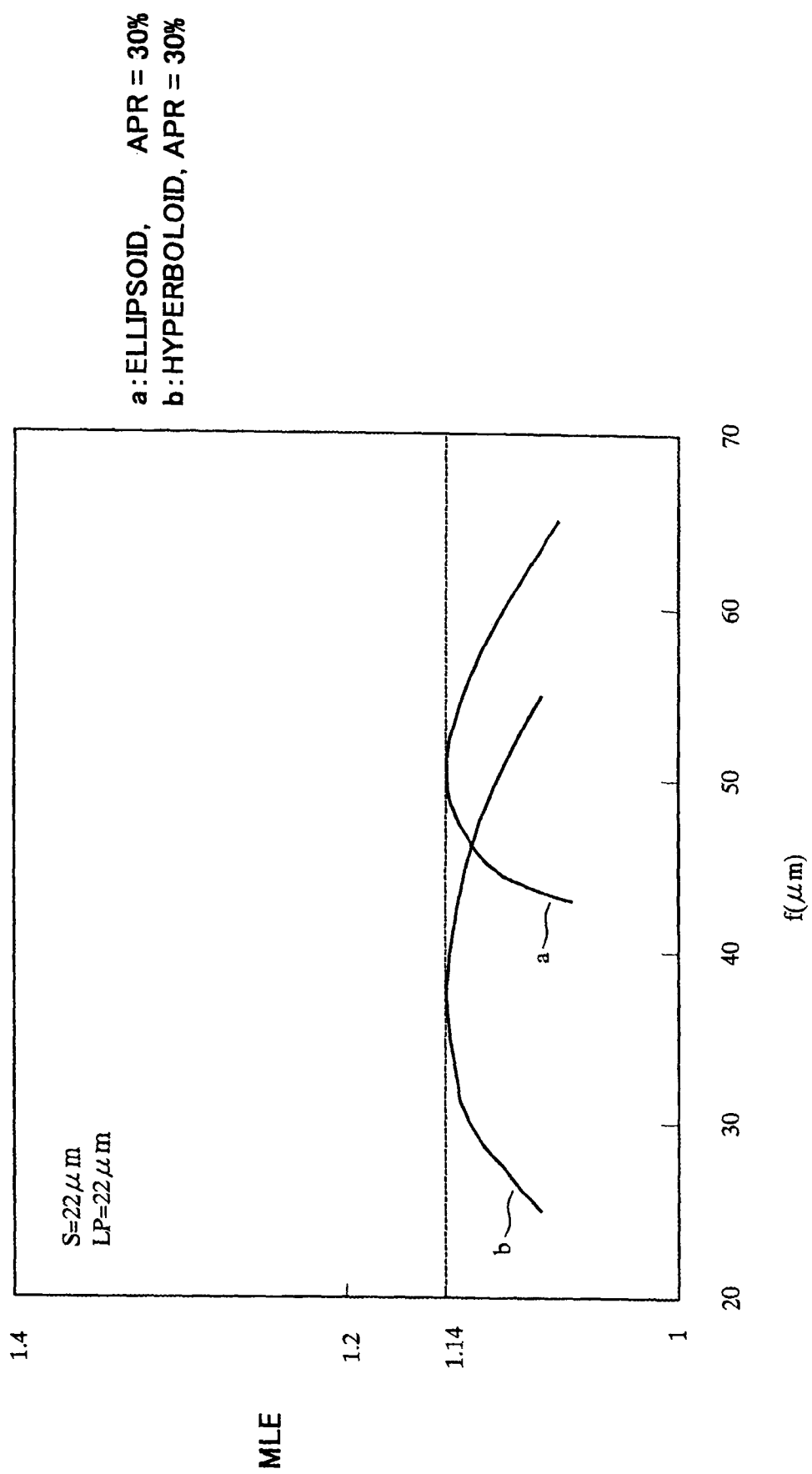
FIG. 10 is a graph of results of a simulation comparing characteristics of rotating hyperboloid microlenses having a lens pitch of 20 µm or more and rotating ellipsoid microlenses having a lens pitch of 20 µm or more.

FIG. 10 shows the simulation results of a tendency for the ML efficiency and the maximum value thereof to change according to the focal length "f" of the lens for a rotating hyperboloid microlens and a rotating ellipsoid microlens when the lens pitch LP is 22 µm under the same optical system conditions as those in the simulation of FIG. 9. In FIG. 10, the notations are the same as those of FIG. 9.

As shown in FIG. 10, when the lens pitch LP is 22 µm, the ML efficiencies of a lens array of an ellipsoid shape and a lens array of a hyperboloid shape are the same. According to FIG. 10, both of the ML efficiencies of the lens arrays of the hyperboloid shape and the ellipsoid shape become 1.14.

Accordingly, according to FIG. 9 and FIG. 10, from when the lens pitch LP is 20 µm, there arises a difference of the ML efficiency between lens arrays of the ellipsoid shape and the hyperboloid shape.

Figure 11:
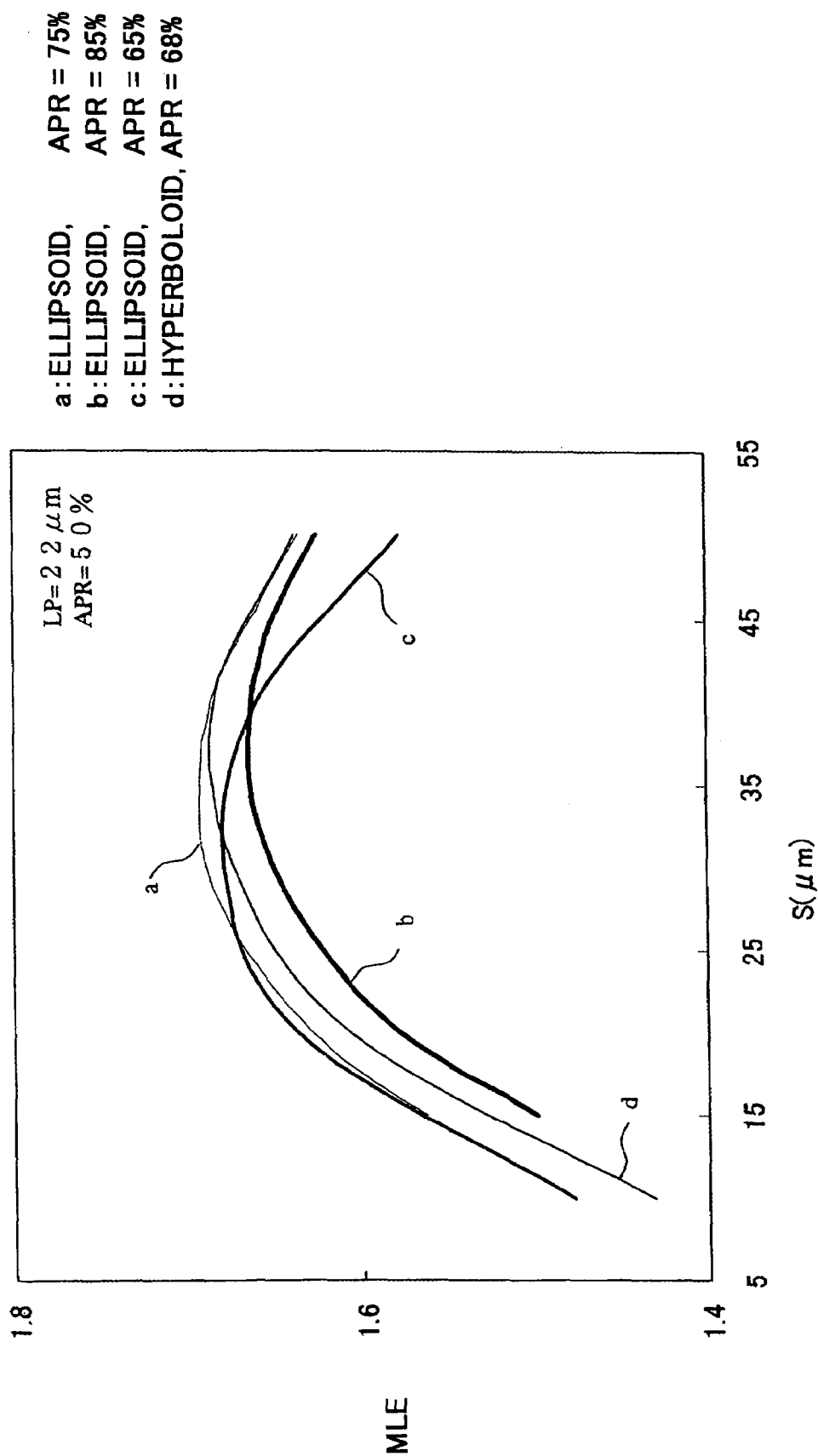
FIG. 11 is a graph of results of another simulation comparing characteristics of rotating hyperboloid microlenses having a lens pitch of 20 µm or more and rotating ellipsoid microlenses having a lens pitch of 20 µm or more.

As another comparative example where the lens pitch LP is 20 µm or less, FIG. 11 shows the results of simulation of the change of the converging efficiency of a microlens array according to the optical path length S when the lens pitch is 22 µm for a rotating hyperboloid microlens and a rotating ellipsoid lens.

In FIG. 11, the lens surface of the microlens is defined by equation 1. In the case of a rotating ellipsoid, the aspherical constant CC is −0.826, and in the case of a rotating hyperboloid, the aspherical constant CC is −1.1.

In FIG. 11, the definitions of the ML efficiency on the ordinate and the optical path length S on the abscissa are the same as those of FIG. 6 and FIG. 7. The curves "a", "b", and "c" indicate the results of ellipsoid microlens arrays where the focal lengths "f" are 75 µm, 85 µm, and 65 µm. The curve "d" indicates the results of a hyperboloid microlens array where the focal length "f" is 68 µm.

As the optical conditions of the simulation of FIG. 11, the light source 1 is a UHP type having an arc length of 1.4 mm, each of the first lens array 2 and the second lens array 3 is constituted by 12 (vertical)×8 (horizontal) microlenses, and the incident light dispersion angle with respect to the liquid crystal display panel 7 becomes 9° in the vertical direction and 11° in the horizontal direction with respect to the principal light. Further, the aperture ratio APR of the pixel electrode portion 46 is 50%, and the F number of the projection lens 8 is F1.7.

As shown in FIG. 11, when the lens pitch LP is 22 µm, a rotating hyperboloid microlens and a rotating ellipsoid microlens having different focal lengths "f" exhibit substantially the same values of ML efficiency and same change in the overall fluctuation range of the optical path length S.

Accordingly, as seen from the simulations of FIG. 6 to FIG. 11, when the lens pitch of the microlens array is 20 µm or more, a rotating hyperboloid microlens and a rotating ellipsoid microlens exhibit substantially the same optical characteristics.

However, when the aperture ratio and the pixel pitch become smaller along with the reduction of size of liquid crystal display panels and the increase of definition, the lens pitch becomes shorter, specifically the lens pitch becomes 20 µm or less. In accordance with this, the focal length becomes shorter, so the thickness S from the lens edge to the cover glass surface must be made thinner. A rotating ellipsoid microlens cannot satisfy the above requirements when the lens pitch is 20 µm or less, while a rotating hyperboloid microlens exhibits good optical characteristics.

Table 1 compares the curvature radii CV, focal lengths f, aspherical constants CC, and lens depths D of microlenses when the aperture ratios APR of the pixel portions become 40% and the ML efficiency becomes the maximum for rotating hyperboloid microlenses and rotating ellipsoid microlenses having lens pitches LP of 14 µm. The curvature radius CV, the focal length "f", the aspherical constant CC, and the depth D of a lens are shown in FIG. 5.

TABLE 1

|    | Ellipsoid | Hyperboloid |
|----|-----------|-------------|
| CV | 7.6 µm    | 6.65 µm     |
| f  | 40 µm     | 35 µm       |
| CC | −0.775    | −1.290      |
| D  | 7.22 µm   | 6.46 µm     |

As shown in Table 1, the lens surface of a microlens is defined by equation 1. In the case of a rotating ellipsoid, the aspherical constant CC is −0.775, while in the case of a rotating hyperboloid, the aspherical constant CC is −1.290.

As shown in Table 1, with an ellipsoid microlens having a lens pitch LP of 14 µm, a curvature radius CV, a focal length "f", and a depth D of the lens giving a maximum ML efficiency become 7.6 µm, 40 µm, and 7.22 µm. On the other hand, in a hyperboloid having a lens pitch LP of 14 µm, the curvature radius CV, the focal length f, and the depth D of the lens giving the ML efficiency become 6.65 µm, 35 µm, and 6.46 µm or smaller than an ellipsoid microlens.

Namely, in comparison with an ellipsoid microlens, a hyperboloid microlens having a lens pitch of 14 µm can make the lens shape smaller, particularly can make the depth D of the lens smaller, so the lens can be made shallower. Due to this, it becomes easy to prepare the hyperboloid microlens in technical terms. The ellipsoid microlens has the tendency that, along with the shortening of the focal length, the curvature of the lens periphery becomes intense and the lens depth becomes greater.

Next, an explanation will be given of the operation of the display device of the above embodiment.

Figure 1:
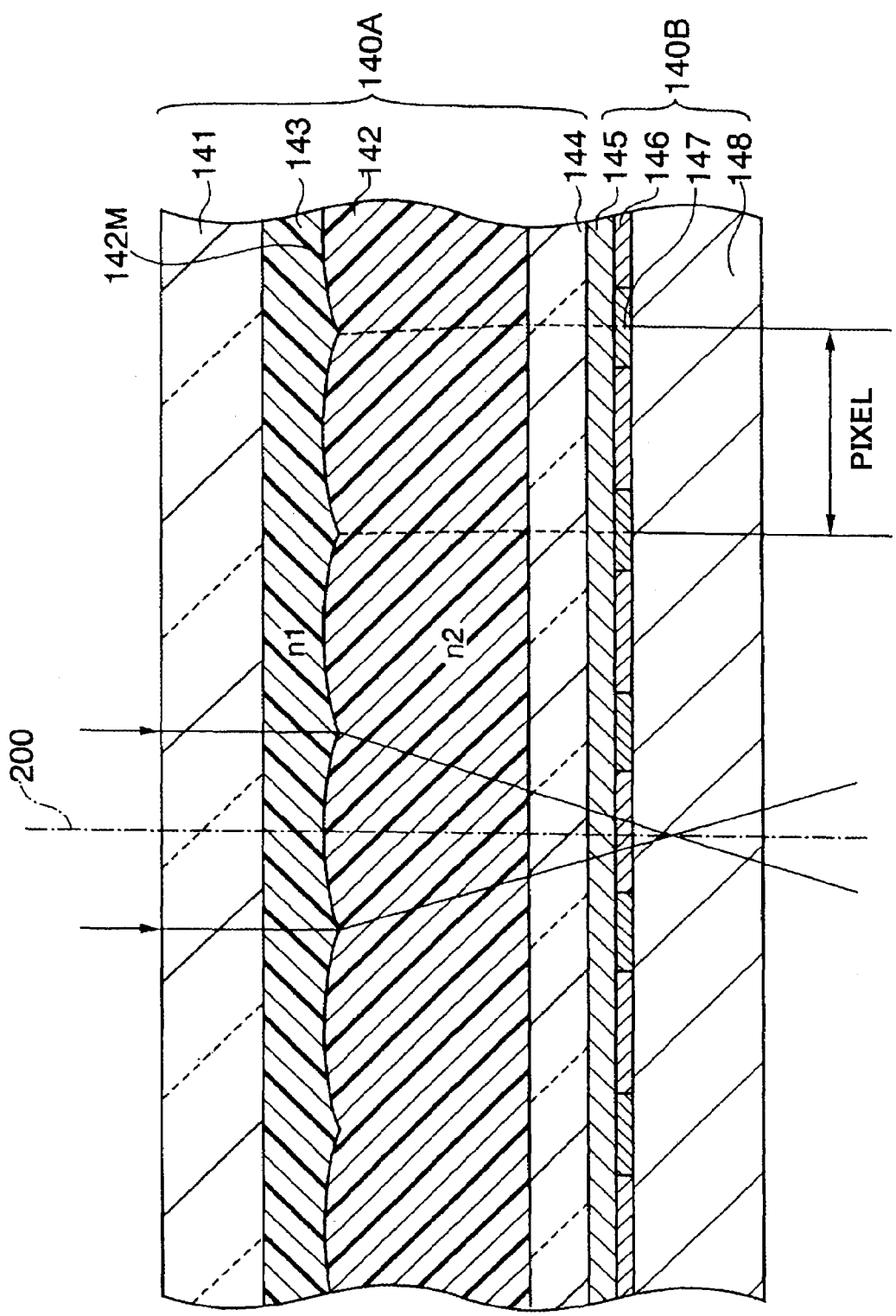
FIG. 1 is a view of an example of the configuration of a display element in a conventional display device.
Figure 3A:
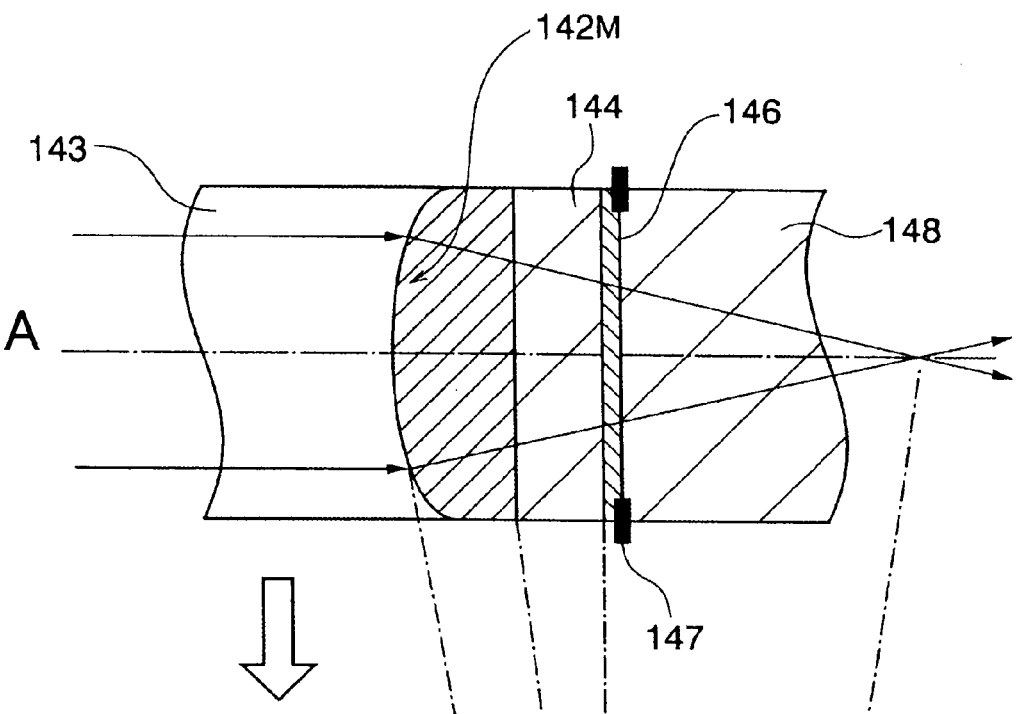
FIGS. 3A and 3B are views of a change in the configuration of the display elements in a display device along with higher definition.
Figure 3B:
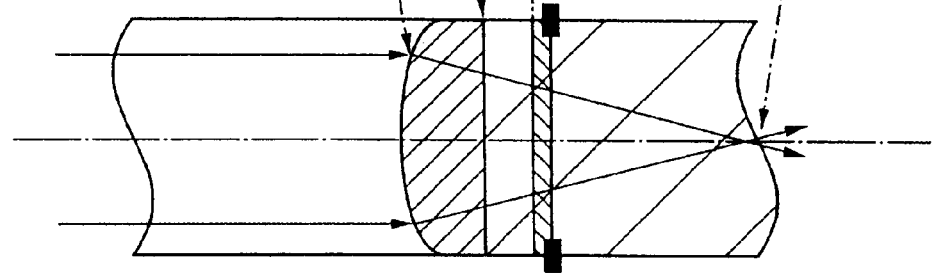

In the liquid crystal display device shown in FIG. 1, the illumination light emitted from the light source 1 passes through the MLAs 2 and 3, and is split into a plurality of small light beams which are made to strike the PS combining element 4. The light L10 striking the PS combining element 4 is split into the two types of polarized light L11 and L12 (P polarization component and S polarization component). One polarized light L11 between the split polarized light L11 and L12 is emitted from the PS combining element 4 while maintaining its polarizing direction (for example, P polarization) as it is. The other polarized light L12 (for example S polarization component) is converted to the other polarization component (for example P polarization component) by the ½ wavelength plate 4A. The polarizing directions of the two split polarized light L11 and L12 are made uniform and emitted in a specific direction.

The light emitted from the PS combining element 4 passes through the condenser lens 5 and the field lens 6 and irradiated to the liquid crystal display panel 7. The small light beams split by the MLA 2 and MLA 3 are magnified with a magnification rate determined by the focal length of the condenser lens 5 and the focal length of the lens 2 provided in the second MLA 3 and irradiate the entire incident surface of the liquid crystal display panel 7. Due to this, a plurality of magnified light beams are superimposed on the incident surface of the liquid crystal display panel 7, and uniform illumination is made as a whole. The light irradiated to the liquid crystal display panel 7 is condensed by the microlens array 42 constituted by a plurality of microlenses 42M having hyperbolic lens surfaces and having a lens pitch of 20 μm or less, converged to the opening of a pixel portion having the pixel pitch of 20 μm or less corresponding to each microlenses 42M, spatially modulated in accordance with the drive signal corresponding to the image signal supplied to the pixel electrode portions 46 by the liquid crystal layer 45, and emitted. The light emitted from the liquid crystal display panel 7 is projected to a not illustrated screen by the projection lens 8 and forms an image on the screen.

According to the present embodiment, when the lens is pitch is 20 μm or more, a rotating hyperboloid microlens and a rotating ellipsoid microlens exhibit substantially the same optical characteristics, but even if the focal length is shortened and the thickness S from the lens edge to the cover glass surface becomes smaller as the aperture ratio and the pixel pitch become smaller along with the reduction of size and increase in definition of liquid crystal display panels, a rotating hyperboloid microlens can still maintain a high converging efficiency. Particularly, when the lens pitch is 20 μm or less, a rotating hyperboloid microlens exhibits better optical characteristics than a rotating ellipsoid microlens, has a large margin of the converging efficiency with respect to variation of the focal length and variation of the thickness S from the lens edge to the cover glass surface, does not require making a cover glass very thin, and can be applied to high definition display.

Further, a hyperboloid microlens can make the lens shape shallower, so it is possible to easily produce it.

Second Embodiment

Figure 12:
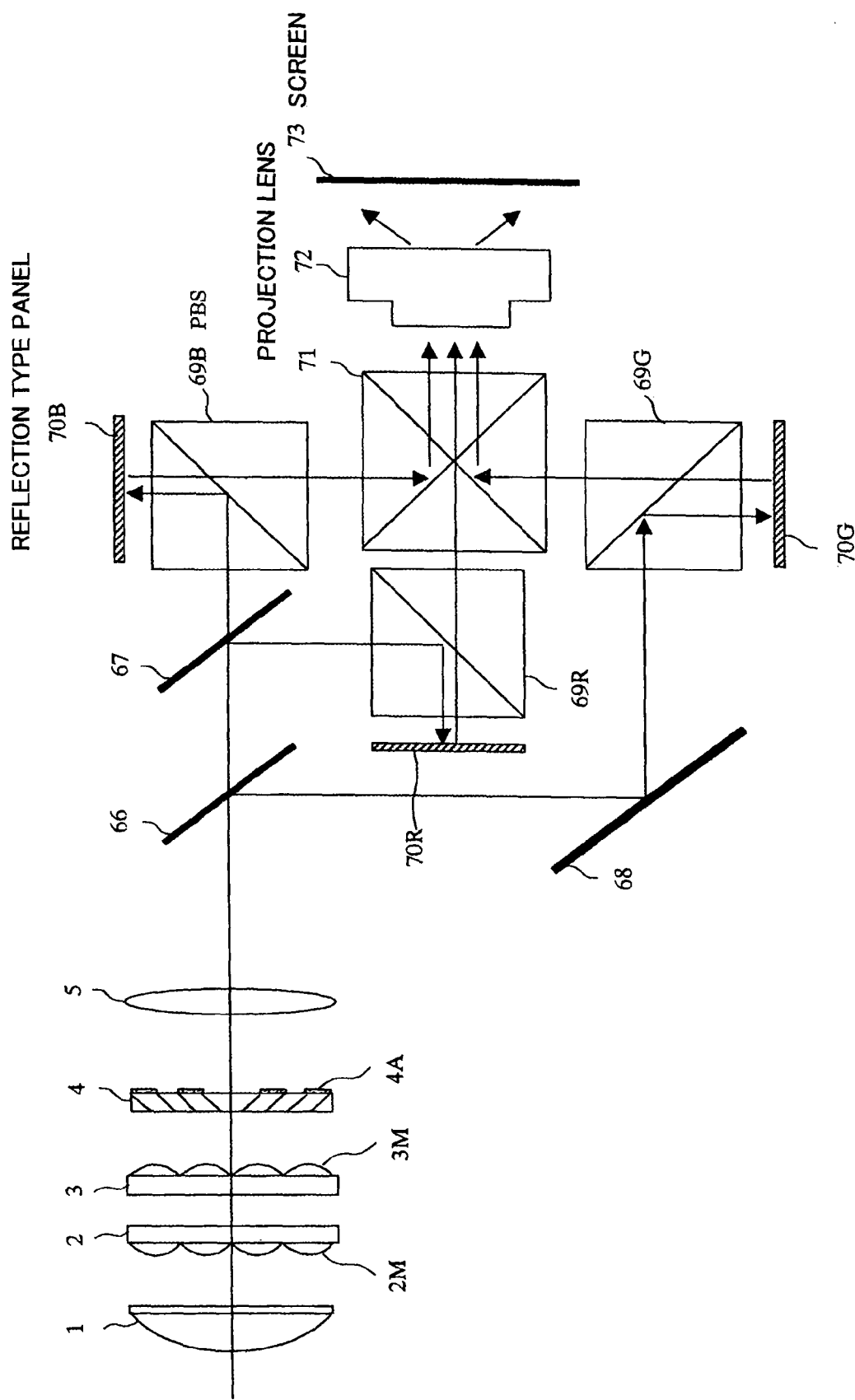
FIG. 12 is a schematic view of the configuration of a display device according to a second embodiment of the present invention.

FIG. 12 shows the schematic configuration of a liquid crystal display device according to a second embodiment of the present invention.

FIG. 12 shows a three-plate type reflection type projector device. The reflection layer is built into a liquid crystal display panel.

Note that components the same as those of the first embodiment are assigned the same notations and explanations are omitted.

The liquid crystal display device of FIG. 13 has a light source 1, a pair of first lens array 2 and second lens array (hereinafter described as "MLA") 3, a PS combining element 4, a condenser lens 5, a first separation mirror 66, a second color separation mirror 67, a reflection mirror 68, a first polarization beam splitter (PBS) 69R, a second polarization beam splitter 69G, a third polarization beam splitter 69B, a first reflection type liquid crystal display panel 70R, a second reflection type liquid crystal display panel 70G, a third reflection type liquid crystal display panel 70B, a color combining prism 71, a projection lens 72, and a screen 73.

The condenser lens 5 converts the light emitted from the PS combining element 4 to substantially parallel light beams and emits these toward the first color separation mirror 66. The first color separation mirror 66 reflects the light of a predetermined wavelength (green colored light in FIG. 12) toward the reflection mirror 68 on the optical path of the illumination light emitted from the condenser lens 5. The remaining illumination light passes through the first color separation mirror 66. The second color separation mirror 67 reflects the illumination light having a predetermined wavelength (red colored light in FIG. 12) toward the first polarization beam splitter 69R on the optical path of the illumination light passing through the first color separation mirror 66. The remaining illumination light (blue colored light in FIG. 12) strikes the third polarization beam splitter 69B. By these, the illumination light emitted from the light source 1 is separated to illumination light of R (red), G (green), and B (blue).

At the first polarization beam splitter 69R, in the incident illumination light, the illumination light of the predetermined polarization plane is reflected toward the first reflection type liquid crystal display panel 70R. The illumination light of the polarization plane orthogonal to this polarization plane passes through the first polarization beam splitter 69R.

The first reflection type liquid crystal display panel 70R spatially optically modulates the incident illumination light. This modulated light is made to again strike the first polarization beam splitter 69R. Then, the polarization component in the modulated light is passed through the first polarization beam splitter 69R and emitted to the color combining prism 71.

The second polarization beam splitter 69G and the third polarization beam splitter 69B similarly operate.

The color combining prism 71 combines the modulated light incident from the first to third polarization beam splitters 69R, 69G, and 69B. The projection lens 72 projects this combined light to the screen 73.

Figure 13:
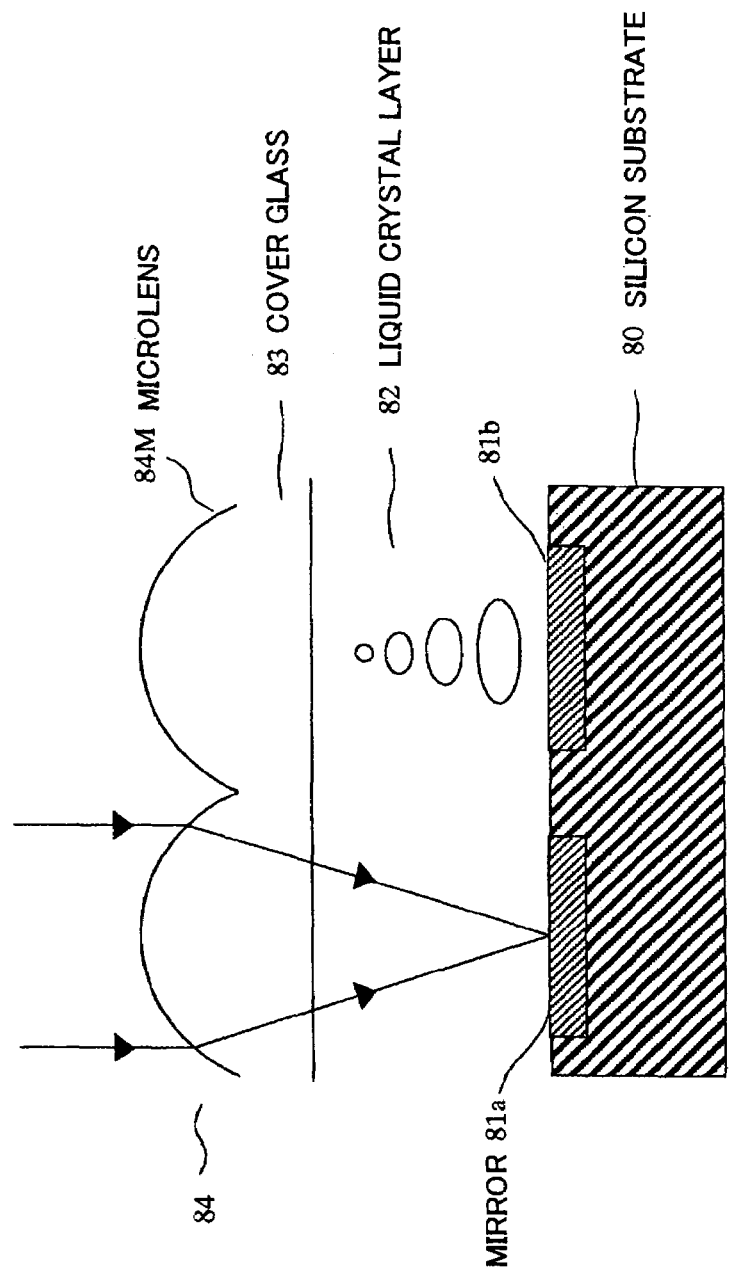
FIG. 13 is a view of an example of the configuration of a display element in the display device according to the second embodiment of the present invention.

FIG. 13 is a view of an example of the configuration of reflection type liquid crystal display panels 70R, 70G, and 70B (abbreviated as 70).

As shown in FIG. 13, the liquid crystal display panel 70 is provided with a silicon substrate 80, a liquid crystal layer 82, cover glass 83 acting as for example a glass substrate arranged on the incident side of the light, and a microlens array 84 formed on the cover glass 83 and condensing light to the pixel portions. Further, the silicon substrate 80 is provided with a reflection mirror 81 for every pixel. Reflection mirrors 81*a* and 81*b* reflect the incident light which is condensed at the microlens array 84 and incident upon the liquid crystal layer 82 after passing through the liquid crystal layer 82 and pass the light through the liquid crystal layer 82 again and emit it to the incident side.

At this time, due to the electric field applied to each pixel, the liquid crystal rotates. Due to the nature of the flash property of a liquid crystal material, the polarization plane of the incident light rotates.

In the reflection type liquid crystal display panel, by forming the interconnect of each pixel on the non-incident side of the reflection layer (the side of the portion through which the light does not pass), even if the number of pixels increases, the aperture ratio is not deteriorated. For this reason, a liquid crystal display panel of a small size may be provided with many pixels.

The microlens array 84 has a plurality of microlenses 84M provided two-dimensionally corresponding to the pixels of the liquid crystal layer 82. Each microlens 84M condenses the incident light toward the reflection mirror 81*a* or 81*b* corresponding to each pixel.

In the present embodiment, in the liquid crystal display panel 70, along with the reduction of size and the increase of definition, the pixel pitch is set at 20 μm or less. Corresponding to this, the microlens array 84 is formed with a lens pitch (LP) of 20 μm or less.

When the lens pitch becomes 20 μm or less, due to the variation of the focal length of the microlenses 84M and the variation of the thickness of the optical resin from the lens edge to the liquid crystal layer 82, the converging efficiency of the microlens array 84 is liable to fluctuate and the display luminance to fluctuate or fall on the screen 73.

In the present embodiment, each microlens 84M is formed with a rotating hyperboloid shape. Due to this, when the lens pitch is 20 μm or less, even if there is variation of the focal length and variation of the thickness of the optical resin from the lens edge to the liquid crystal layer 82, the converging efficiency of the microlens array 84 does not fluctuate much.

The rotating hyperboloid lens surface of the microlens 84M is defined by equation 1 in the same way as the first embodiment. Further, the rotating hyperboloid shapes of the microlens 42M and the microlens 84M satisfy the condition that the spherical aberration becomes zero and condense the incident light beams to the reflection mirrors 81*a* and 81*b* without spherical aberration.

The embodiment is designed so that the focal position of each microlens 84M substantially coincides with the positions of the reflection mirrors 81*a* and 81*b*.

Next, an explanation will be given of the operation of the above liquid crystal display device.

The light emitted from the PS combining element 4 is converted to substantially parallel light beams by the condenser lens 65 and emitted toward the first color separation mirror 66. At the first color separation mirror 66, for example, the green colored light is reflected toward the reflection mirror 68 on the optical path of the illumination light emitted from the condenser lens 65, while the remaining illumination light is passed. At the second color separation mirror 67, for example the red colored light is reflected toward the first polarization beam splitter 69R on the optical path of the illumination light passed through the first color separation mirror 66, while the remaining blue colored light strikes the third polarization beam splitter 69B.

The red colored illumination light reflected at the second color separation mirror 67 strikes the first polarization beam splitter 69R. The green colored illumination light reflected at the first color separation mirror 66 is reflected toward the reflection mirror 68 and strikes the second polarization beam splitter 69G. Further, the blue colored illumination light passed through the second color separation mirror 67 again strikes the third polarization beam splitter 69B.

At the first polarization beam splitter 69R, in the incident illumination light, the illumination light of a predetermined polarization plane is reflected toward the first reflection type liquid crystal display panel 70R, while the illumination light of the polarization plane orthogonal to this polarization plane is passed.

Further, in the first reflection type liquid crystal display panel 70R, the light irradiated to the first reflection type liquid crystal display panel 70R is condensed by the microlens array 84 constituted by a plurality of microlenses 84M having hyperboloid lens surfaces and having a lens pitch of 20 μm or less, passes through the liquid crystal layer 82, is converged to the reflection mirrors 81*a* and 81*b* of the pixel portions having a pixel pitch of 20 μm or less corresponding to each microlens 84M, and then is reflected at the reflection mirrors 81*a* and 81*b*, passes through the liquid crystal layer 82 again, is spatially optical modulated, and again strikes the first polarization beam splitter 69R. Then, at the first polarization beam splitter 69R, the polarization component in the modulated light is passed and emitted to the color combining prism 71.

The second polarization beam splitter 69G and the third polarization beam splitter 69B similarly operate.

At the color combining prism 71, the modulated light incident from the first to third polarization beam splitters 69R, 69G, and 69B are combined. This combined light is projected via the projection lens 72 onto the screen 73.

By this, the images formed by the first to third reflection type liquid crystal display panels 70R, 70G, and 70B are magnified and projected onto the screen 73 to display the intended color image.

As explained above, when the lens pitch is 20 μm or more, a rotating hyperboloid microlens and a rotating ellipsoid microlens exhibit substantially the same optical characteristics, but as aperture ratio and the pixel pitch become smaller along with the reduction of size and the increase in definition of liquid crystal display panels, when the focal length is short and the thickness from the lens edge to the cover glass surface becomes smaller, the converging efficiency of a rotating ellipsoid microlens is lowered, but a rotating hyperboloid microlens can still maintain a high converging efficiency. Particularly, when the lens pitch is 20 μm or less, a rotating hyperboloid microlens exhibits more conspicuous effects than a rotating ellipsoid microlens, has a larger margin of focus efficiency with respect to variation of the focal length and variation of the thickness from the lens edge to the cover glass surface, and does not require making the cover glass very thin. Accordingly, if use is made of rotating hyperboloid microlenses having a lens pitch of 20 μm or less, a higher definition display can be handled.

The present embodiment exhibits the same effects as those of the first embodiment.

While the present invention was explained above based on preferred embodiments, the present invention is not limited to the embodiments explained above. Various modifications are possible within a range not out of the gist of the present invention.

The configurations of the projection type liquid crystal display devices explained in the first and second embodiments are examples. The present invention is not limited to these configurations. Other configurations can be employed too so far as the object of the present invention can be achieved.

Further, the present invention can be applied to not only a liquid crystal display device, but also a display device using light valves such as digital mirror devices (DMD).

Summarizing the effects of the invention, according to the present invention, even if the focal length becomes shorter and the distance from the lens to the pixel portion becomes thinner along with the reduction of the aperture ratio and the pixel pitch due to increased definition, a rotating hyperboloid microlens can maintain a high converging efficiency. Particularly, when the lens pitch is 20 μm or less, a rotating hyperboloid microlens exhibits conspicuous effects, and has a large margin of focus efficiency with respect to variation of the focal length and variation of the thickness from the lens to the pixel portion, so can handle high definition display.

While the invention has been described with reference to specific embodiment chosen for purpose of illustration, it should be apparent that numerous modifications could be made thereto by those skilled in the art without departing from the basic concept and scope of the invention.

What is claimed is:

1. A display element comprising:
a plurality of pixel portions arranged two-dimensionally with a predetermined pixel pitch and
a microlens array including a plurality of microlenses arranged two-dimensionally corresponding to said plurality of pixel portions on an incident side or an emission side of light with respect to said pixel portions, wherein,
in said microlens array, each microlens has a lens surface of a hyperboloid of revolution, and a lens pitch of said plurality of microlenses is set to a pitch smaller than the lens pitch able to substantially equivalently maintain a converging efficiency of a lens of the hyperboloid of revolution and a lens of an ellipsoid of revolution with respect to the incident light and able to maintain a converging efficiency higher than the converging efficiency of the lens of the ellipsoid of revolution.

2. A display element as set forth in claim 1, wherein the pixel pitch is made 20 μm or less.

3. A display element as set forth in claim 1, wherein the focal position of each microlens substantially coincides with each pixel portion.

4. A display element comprising:
a plurality of pixel portions arranged two-dimensionally with a predetermined pixel pitch and
a microlens array including a plurality of microlenses arranged two-dimensionally corresponding to said plurality of pixel portions on an incident side or an emission side of light with respect to said pixel portions, wherein,
in said microlens array, each microlens has a lens surface of a hyperboloid of revolution, and a lens pitch is 20 μm or less.

5. A display element as set forth in claim 4, wherein the pixel pitch is 20 μm or less.

6. A display element as set forth in claim 4, wherein the focal position of each microlens substantially coincides with each pixel portion.

7. A display device comprising:
a plurality of pixel portions arranged two-dimensionally with a predetermined pixel pitch,
a light source emitting illumination light for illuminating said pixel portions,
a microlens array including a plurality of microlenses arranged two-dimensionally corresponding to said plurality of pixel portions on an incident side or an emission side of light with respect to said pixel portions, and
a projection lens for projecting light emitted from said pixel portions, wherein,
in said microlens array, each microlens has a lens surface of a hyperboloid of revolution, and a lens pitch of said plurality of microlenses is set to a pitch smaller than a lens pitch able to substantially equivalently maintain a converging efficiency of a lens of a hyperboloid of revolution and a lens of an ellipsoid of revolution with respect to the incident light and able to maintain a converging efficiency higher than the converging efficiency of a lens of the ellipsoid of revolution.

8. A display device as set forth in claim 7, wherein the pixel pitch is 20 μm or less.

9. A display device as set forth in claim 7, wherein the focal position of each microlens substantially coincides with each pixel portion.

10. A display device comprising:
a plurality of pixel portions arranged two-dimensionally with a predetermined pixel pitch,
a light source emitting illumination light for illuminating said pixel portions,
a microlens array including a plurality of microlenses arranged two-dimensionally corresponding to said plurality of pixel portions on an incident side or an emission side of light with respect to said pixel portions, and
a projection lens for projecting light emitted from said pixel portions, wherein,
in said microlens array, each microlens has a lens surface of a hyperboloid of revolution, and a lens pitch is 20 μm or less.

11. A display device as set forth in claim 10, wherein the pixel pitch is 20 μm or less.

12. A display device as set forth in claim 10, wherein the focal position of each microlens substantially coincides with each pixel portion.

13. A microlens array including a plurality of two-dimensionally arranged microlenses, wherein
each microlens has a lens surface of a hyperboloid of revolution, and the lens pitch of said plurality of microlenses is set at a pitch smaller than the lens pitch able to substantially equivalently maintain the converging efficiency of a lens of the hyperboloid of revolution and a lens of an ellipsoid of revolution with respect to the incident light and able to maintain a higher converging efficiency than the converging efficiency of a lens of the ellipsoid of revolution.

14. A microlens array including a plurality of two-dimensionally arranged microlenses, wherein:
each microlens has a lens surface of a hyperboloid of revolution, and the lens pitch of said plurality of microlenses is 20 μm or less.

* * * * *